No. 719,778. PATENTED FEB. 3, 1903.
B. FORD.
STORAGE BATTERY TANK.
APPLICATION FILED DEC. 11, 1902.
NO MODEL.

WITNESSES:

INVENTOR.
Bruce Ford.
BY
Augustus B. Stoughton
ATTORNEY.

THE NORRIS PETERS CO., PHOTO-LITHO., WASHINGTON, D. C.

UNITED STATES PATENT OFFICE.

BRUCE FORD, OF PHILADELPHIA, PENNSYLVANIA, ASSIGNOR TO ELECTRIC STORAGE BATTERY COMPANY, OF PHILADELPHIA, PENNSYLVANIA, A CORPORATION OF NEW JERSEY.

STORAGE-BATTERY TANK.

SPECIFICATION forming part of Letters Patent No. 719,778, dated February 3, 1903.

Application filed December 11, 1902. Serial No. 134,782. (No model.)

*To all whom it may concern:*

Be it known that I, BRUCE FORD, a citizen of the United States, residing at the city of Philadelphia, in the county of Philadelphia and State of Pennsylvania, have invented certain new and useful Improvements in Storage-Battery Tanks, of which the following is a specification.

The objects of the present invention are to provide tanks of which the lining of the compartments can be flanged all around the top of the latter to prevent accumulations of acid, dust, and the like between the compartments, which would tend to produce short circuits, to provide for draining acid that may find its way between the compartments, and to provide a reliable, durable, and efficient storage-battery tank.

To these and other ends hereinafter set forth the invention comprises the improvements to be presently described and finally claimed.

The nature, characteristic features, and scope of my invention will be more fully understood from the following description, taken in connection with the accompanying drawings, forming part hereof, and in which—

Figure 1:
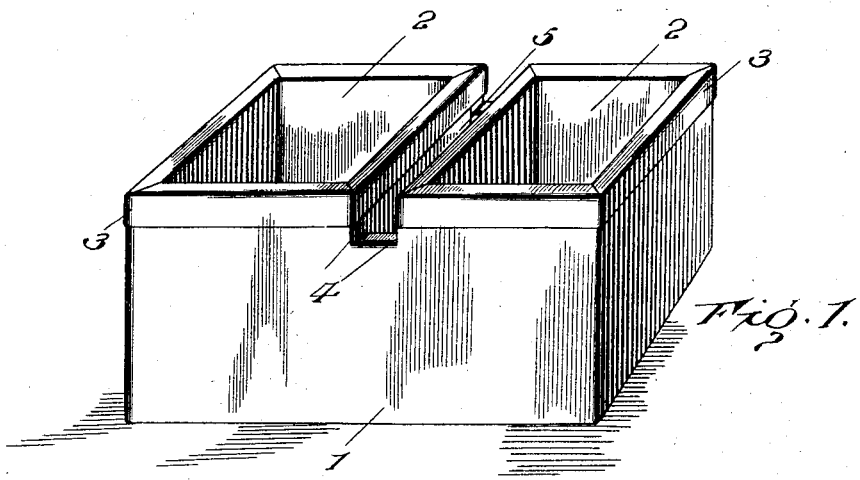
Figure 2:
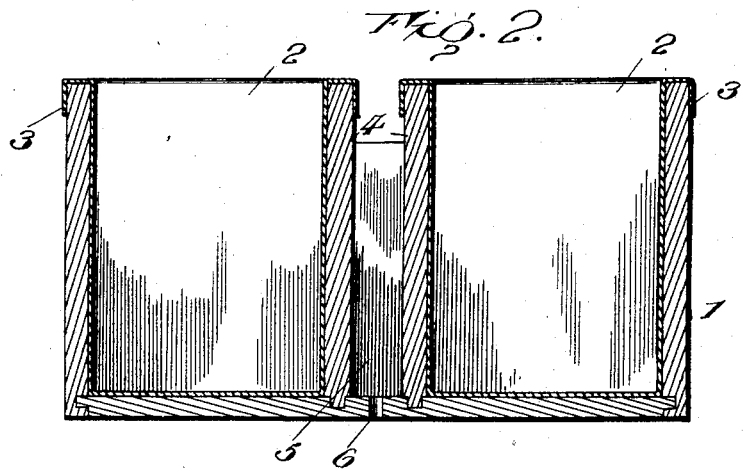
Figure 3:
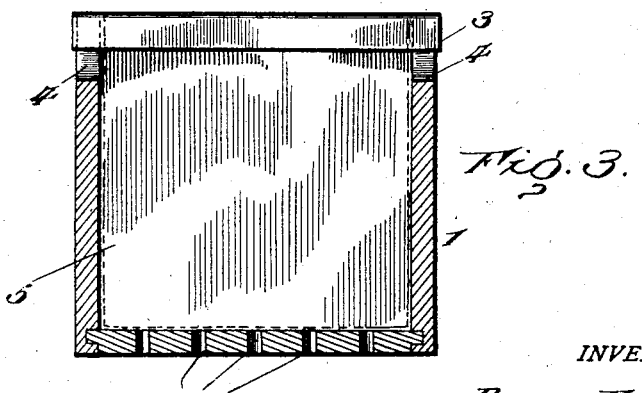

Figure 1 is a perpective view of a tank embodying features of the invention. Fig. 2 is a longitudinal central sectional view of the same, and Fig. 3 is a transverse central sectional view of the same.

In the drawings, 1 is a tank, and it consists of two or more compartments 2. Each of these compartments is lined with acid-resisting material 3, as sheet-lead or lead alloyed with antimony. At the top of the compartment this lining is turned over, so as to constitute a flange, and the flange extends all around the top of the compartment, as shown in the drawings. The compartments are separated by a double-wall partition. The walls of the double partition are designated 4, and between them there is an air-space 5, which extends from the bottom to the top of the tank, so that acid or dust will find its way into the air-space 5, from which it can be drained by means of the holes or openings 6 at the bottom of the air-space.

It will be obvious to those skilled in the art to which my invention appertains that modifications may be made in detail without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A battery-tank consisting of two or more compartments each of which is lined with acid-resisting material and said compartments separated by a double-wall partition having an air-space between the two walls of the partition which extends from the bottom to the top of the tank, substantially as described.

2. A battery-tank consisting of two or more compartments each of which is lined with acid-resisting material and said compartments separated by a double-wall partition having an air-space between the two walls of the partition which extends from the bottom to the top of the tank, and drain-holes in the bottom of the air-space, substantially as described.

3. A battery-tank consisting of two or more compartments separated by a double-wall partition having an air-space between its two walls which extends from the bottom to the top of the tank, and an acid-resisting material applied as a lining to each of said compartments with its upper portion turned down or flanged all around outside of the top of its compartment, substantially as described.

In testimony whereof I have hereunto signed my name.

BRUCE FORD.

Witnesses:
HUGH LESLEY,
EDGAR LONGAKER.